June 29, 1965   J. E. FOSTER   3,192,355
BUTT WELDING OF ANNULAR SURFACES OR PIPES
END-TO-END WITH SCANNING WELD CURRENT
Filed Aug. 29, 1961   4 Sheets-Sheet 1

INVENTOR.
Julius E. Foster

*INVENTOR.*
Julius E. Foster

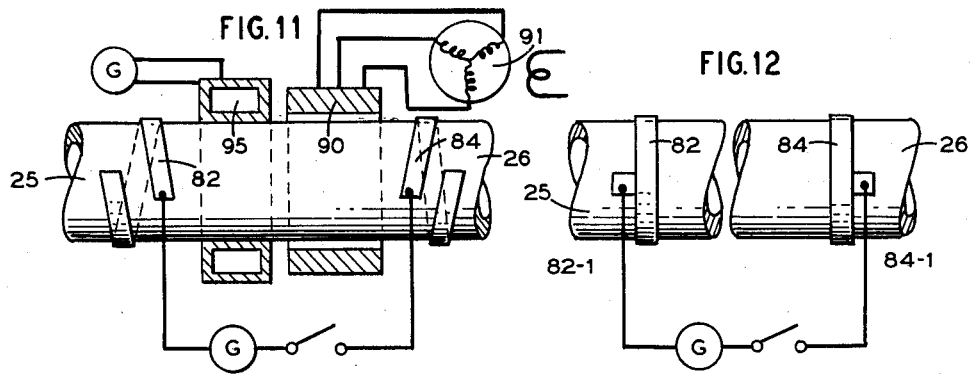
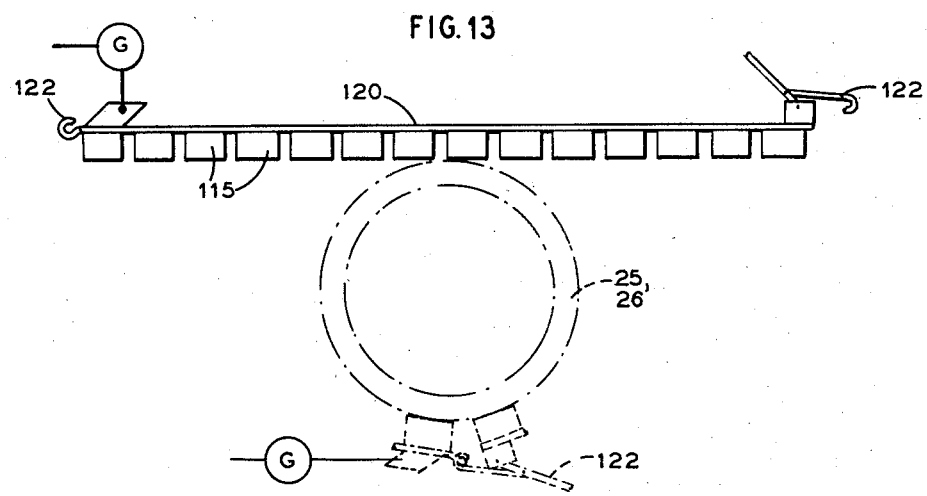
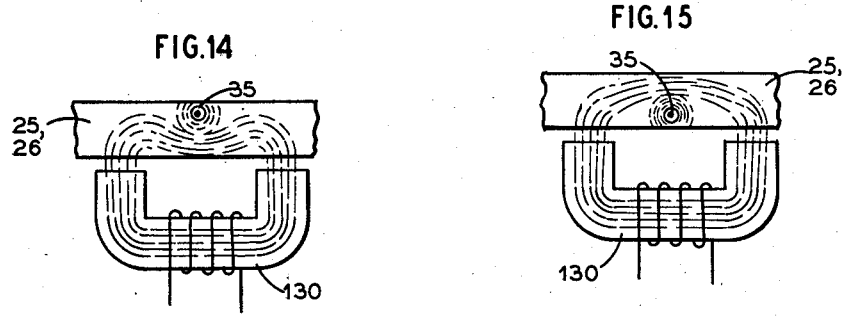
INVENTOR.
Julius E. Foster

June 29, 1965 J. E. FOSTER 3,192,355
BUTT WELDING OF ANNULAR SURFACES OR PIPES
END-TO-END WITH SCANNING WELD CURRENT
Filed Aug. 29, 1961 4 Sheets-Sheet 4

INVENTOR.
Julius E. Foster

United States Patent Office 3,192,355
Patented June 29, 1965

3,192,355
BUTT WELDING OF ANNULAR SURFACES OR PIPES END-TO-END WITH SCANNING WELD CURRENT
Julius E. Foster, 9 Mountain Way, Rutherford, N.J.
Filed Aug. 29, 1961, Ser. No. 135,108
25 Claims. (Cl. 219—67)

This invention relates to electric welding, and particularly to a method of, and apparatus for, welding two engaging annular surfaces, for connecting two independent bodies, such as, for example, the engaging ends of two adjacent pipes, to be used as an example herein, for illustrative purposes. The weld is achieved by causing a weld current to pass from one body, here the pipe, to the other, through the butting surfaces, and then shifting the weld current stream section to cause it to scan the seam surfaces that are to be welded together.

Electric resistance welding consists generally in placing two metal elements together in surface-to-surface relation where the weld is to be established between those surfaces, and then in applying the welding current to the two elements in such manner that the current will pass between the contacting surfaces and establish sufficient heat at those surfaces to effect a weld at and between those surfaces.

This application is a continuation-in-part of my co-pending application Serial No. 806,074 filed April 13, 1959, relating to Welding System With Scanning Weld Current, now Patent No. 3,042,788 issued July 3, 1962.

In the co-pending application and patent referred to above, a welding system is shown in which the welding current stream which crosses between the two butting or seam surfaces, is electro-dynamically controlled to cause the welding current stream section to shift and scan the entire areas of the two seam surfaces that are in engagement, so the heating effect of the welding current and the consequent welding action will be effective over the entire surface areas of those two seam surfaces.

The electro-dynamic action for shifting the welding current stream section is accomplished by developing a moving magnetic flux field of suitable polarity to react upon the magnetic flux field induced by, and surrounding, the welding current stream itself. The welding current stream then acts as a movable conductor and is caused to move in a direction that is controlled by the relationship between the two magnetic flux fields.

In U.S. Patent No. 2,882,384 issued April 14, 1959, this type of electro-magnetic control of a welding current stream was shown as achieved by a stationary magnetic control flux field. In the co-pending application noted above, Serial No. 806,074, the welding current stream is controlled to scan the seam surfaces by a moving magnetic flux control field.

In the system disclosed in that co-pending application, the moving magnetic flux field is employed to react upon the flux field of the welding current stream in order to cause the welding current stream to move or shift in a direction there representing the longitudinal or linear dimension of the surfaces to be welded. In order to control the location of the linear path through which the current stream section is caused to move, and in order to shift such linear path location laterally of the central longitudinal linear dimension or axis, a second magnetic flux control field is employed with appropriate polarity to shift the welding current stream laterally of such central longitudinal dimension, in one direction or the other, to one edge or the other of the seam surface to be welded.

In said patent and in said co-pending application, the controlled welding system is illustrated as applied to the seam welding of thick-walled pipe. The welding current was supplied for passage across the seam by two roller electrodes that rolled along the pipe on both sides of the seam. The current between the two electrodes crossed the two seam surfaces and heated them to establish the welding action.

The relative movement between the roller electrodes and the moving pipe located the essential terminals or ends of the weld current stream along relatively moving paths.

The use of an external magnetic control flux field, for shifting and controlling the location of a welding current stream section, enables the resistance welding operation to be applied to relatively wide surface areas for the butt welding of thick metal sections.

While these processes, particularly as described, lend themselves quite naturally to operation on large machines in manufacturing mills, for making thick-wall pipe, this method of welding has such flexibility and advantageous features, that it would be desirable to be able to use this welding method in the butt-welding of pipes end to end, for welding operations in the field, where pipes are to be welded together to provide a transmission line for fluids, such as gas or oil.

Such welding method would also be desirable for the welding of pipes in earth-boring operations, where the weight of a long string of pipe imposes a requirement for a strong coupling between pipe sections.

At present, large diameter pipe sections that are to be used for liquid or fluid transmission, are welded by the conventional gas flame and torch method.

In oil field use, flame welding is hazardous and uncertain. Consequently, the ends of the drilling pipe section are threaded and adjoining pipe sections are joined by a threaded coupling.

A primary object of this invention is to provide a method of and apparatus for welding, that will enable two pipe ends of relatively thick section to be butt-welded.

Another object of the invention is to provide a method of and apparatus for butt-welding two pipe ends, in an operation that utilizes the principle of controlling the location of the weld current stream, between two butting seam surfaces, by means of properly located and oriented and external magnetic flux control fields that will automatically cause the weld current section to scan the entire surface areas of the seam surfaces to achieve a complete overall surface weld, free of any stress concentration lines at the contours of the welded areas.

Another object is to provide a method of, and apparatus for, achieving a complete surface-to-surface weld between the abutting ends of two adjacent pipe sections in a string of oil well drill pipe.

In attempting to apply the welding method and operation of the co-pending application to the welding of the adjacent engaging ends of two pipe sections, a problem is encountered. Since the welding current stream section is shifted and moved in the scanning operation, it would be desirable that there be a corresponding equivalent simple shifting of the terminal ends of the welding current stream. In the pipe welding operation, as shown in the patent and in the co-pending application, equivalent shifting of the terminal ends of the welding current stream is achieved by the natural relative motion between the electrodes and the moving pipe.

However, in the case of the two stationary pipes whose ends are to be butt-welded together, there is no relative movement that can be utilized, and moreover, because of the large current values that are required in the welding operation, running into the thousands of amperes per square inch, the electrodes must be of substantial cross-sectional area and must closely engage, and therefore conform to, the peripheral surface of the pipe adjacent the seam surface that is to be welded.

Since the welding operation must now be performed in a circular path, as distinguished from a linear path of the type shown in the prior patent and in the co-pending application, the problem arises of controlling the movement of the welding current in a desired direction, in movement around the annular surface areas presented by the two pipe ends that are to be welded. In addition, the problem arises of introducing the welding current at particular points in the circular path in the annular surfaces, with an assurance that the welding current thus introduced will move in the specific selected forward direction desired, and not sub-divide and move in both directions from a point of application.

Thus a further and important object of this invention and a particular feature of the method and system disclosed herein, is to provide a pair of cooperative electrodes for introducing the welding current into the two pipe sections, in such manner that the welding current stream can be caused to start from a specific point on each pipe, adjacent the seam surfaces to be welded, from which points the welding current stream section can then be definitely and positively propelled and shifted progressively through the circular path in the butted annular seam surfaces.

Another object of the invention is to provide a construction and arrangement for such cooperative electrodes for a welding current stream with respect to two stationary metallic members that are to be welded, so that the welding current stream can be definitely and positively controlled, even though there is no relative movement between the electrodes and the metallic members to be welded, with which the electrodes are associated.

When two pipes are to be welded end to end, by the resistance welding method, as utilized herein, it is preferable to scarf the ends of the pipes, where they are to be joined, one with an internal scarf and the other with an external scarf, to enable the two pipe ends to be fitted together so the two scarf surfaces will engage with a seating fit, so that the two surfaces can be welded together with a seam weld. While being welded, the two pipes are held together with some pressure.

An external power circuit is then applied to the two pipes so the welding current will cross from one pipe end to the other, through the two seam surfaces, which will be heated sufficiently by the welding current to establish coalescence and a good weld.

As explained in the prior Patent No. 2,882,384, referred to above, a welding current stream section passing through a magnetizable body such as iron pipe, tends to centralize itself with respect to the inner and outer edge contours of the body, instead of streamlining and traversing the entire width of the body section, which in this case would be the distance between the inner circular peripheral contour and the outer circular peripheral contour.

In order that the welding current shall traverse and heat the entire surface that is to be welded, to form the welded seam, the stream section of the welding current is electro-dynamically controlled, in accordance with this invention, to scan the entire engaging surface areas that are to be welded, to assure a complete weld between those engaging surfaces at the seam.

In order that the welding current stream section may traverse the entire surface areas of the two seam surfaces, the current stream section is moved electro-dynamically in a circular medial path, and, electro-dynamically, is also shifted radially to traverse a circular path in each of the annular regions of the surfaces of the seam, adjacent the inner circular contour edges, and also adjacent the outer circular contour edges.

Movement of the welding current stream section through the circular paths, defined by the annular areas at the seam, is accomplished electro-dynamically, by a rotating magnetic flux field. A stator is disposed to encircle the two pipes at the seam region, with windings in the stator energized in the manner of a three-phase motor stator, to develop the moving magnetic flux field, which rotates and whirls around the central axis of the two pipes in such manner as to react on, and move, the welding current stream section as a rotor, or conductor in a rotor. The welding current stream section is thus whirled in space within the limits of the two seam surfaces.

However, because of the tendency of the current stream section to centralize itself within the section defined by the inner and outer circumferences, as mentioned above, only the medial annular areas of the seam surfaces would be welded if only the rotating magnetic flux field of the stator windings were employed to whirl the welding current stream section.

In order to shift the current stream section to the inner and to the outer annular areas of the seam surfaces, a separate magnetic flux field is provided with appropriate polarity to shift the welding current stream section radially inward or radially outward, so the whirling welding current stream section, as moved by the rotating flux field, will also heat the inner and the outer annular areas adjacent the inner and outer circular contours of the seam surfaces. Such radial shifting field may be controlled to shift the welding current stream section in one or more steps in either direction from the medial path normally assumed, or such radial shifting field may be continuously increased, through appropriate values, to radially shift the welding current stream section through a spiral path from its medial path.

Another important object and feature of this invention is to provide a method of and apparatus for shifting the locus of the welding current stream section from the medial region, of a surface to be welded, to a location laterally displaced from such medial region, so the welding current stream section will scan the entire surface area of each surface to be welded.

To shift the welding current stream section laterally from its self-assumed medial position, a control flux field is induced in each pipe end in an annular region adjacent one peripheral contour edge of the seam surface. That annular control flux field reacts on the welding current flux field and shift the welding current stream section towards the other peripheral contour edge. The strength of the field of the annular control flux determines the strength of the reaction force against the welding current stream section, and, consequently, the locus to which the welding current stream section is laterally shifted.

Such annular control flux field should be effectively continuous. To achieve that, the annular flux field is compounded of several shorter flux fields which individually cover an angular segment of the total annular area to be filled with such flux. Adjacent ones of the shorter flux fields are arranged in overlapping relation, so the sequential fields thus arrayed are in the same direction and essentially effective as a unitary flux field.

In order that a proper weld may be formed, it is preferable to have the two surface areas engaged in contact over as much area as possible. Normally, the two contacting surfaces will be prepared to assure such maximum engagement of the surface areas before the welding operation is commenced. It is desirable, also, to hold those two surface areas in engagement during the welding operation, since the expansion that results from the welding heat will tend to separate the seam surfaces at areas not yet heated. For such holding purpose, the invention contemplates the use of clamps to hold the two pipes together with a suitable amount of initial pressure that will hold the pipes from separating while the welding action takes place. The holding clamps also serve to hold the pipes in position during the cooling of the metal at the seam surface areas.

The welding current is fed to the two pipes through two electrodes. One electrode is fastened tightly to each pipe to establish good electrical contact to the pipe over a substantially cylindrical region adjacent the seam, so the current from the electrode that is to perform the welding, will traverse only as small a portion of the pipe end as possible, in passage to the seam surfaces.

In one modification, each electrode may take the form of one convolution of a helix, so the welding current may be fed into one end of the convolution. That electrode serves as a bus bar. The disposition of such an electrode, on each side of the welded seam surfaces, permits the welding current stream section to be easily whirled around in the pipe body section, with the ends or terminals of the welding current stream relatively free to move in the electrodes as bus bars. The phase windings of the stator electro-dynamic means, for whirling or moving the weld current stream section, will be energized to establish the travelling magnetic flux field moving in a desired direction. By appropriately energizing the phase windings in the stator, the weld current stream section can be whirled in either direction.

In a second modification, the electrodes may be relatively closed rings to serve as bus bars for the welding current. A selected point on each of the electrode rings may be employed as the terminal which will control the point of injection of the welding current into the electrode, and, similarly, the point of exit from the other electrode. Since the welding current at high density will form the condensed stream section previously referred to, due to the iron environment, the direction of movement of the moving flux control field will control the direction of movement and extent of movement of the welding current stream section for scanning the seam surfaces.

Since the welding currents are relatively large, the electrodes will need substantial cross-sectional conducting area. In order to be easily applicable to a pipe, the electrode should be flexible. To provide such heavy current-conducting sectional area and also flexibility, each electrode is preferably made of a series of individual blocks, electrically connected by flexible cables or straps of conducting metal, with additional flexible strap means for tightly applying the electrode to the pipe, with the blocks closely disposed, practically side by side.

The manner in which the system functions, and the arrangement of the various elements and components of the system, are more fully explained in the accompanying specification in connection with the drawings, in which—

Figure 4:
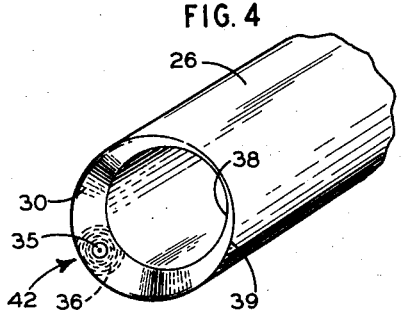
Figure 5:
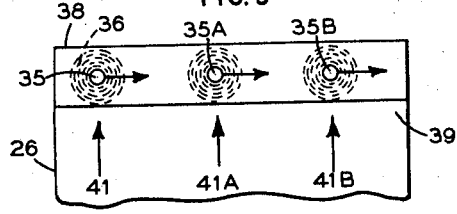
Figure 6:
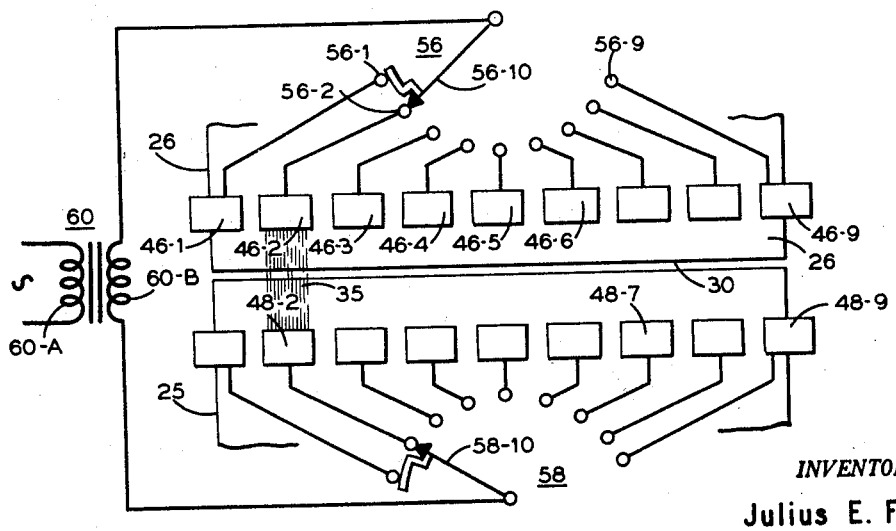
Figure 7:
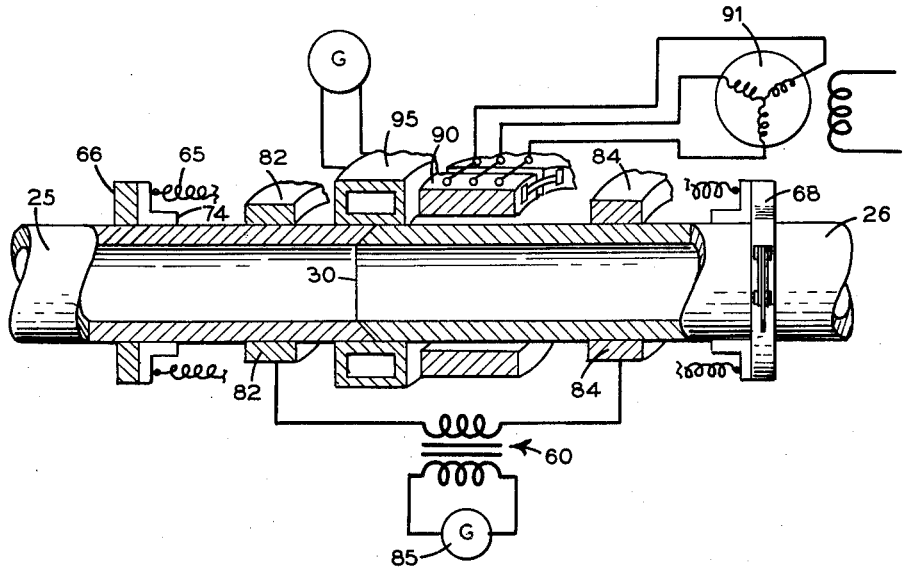
Figure 9:
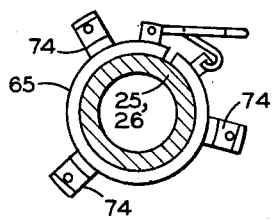
Figure 8:
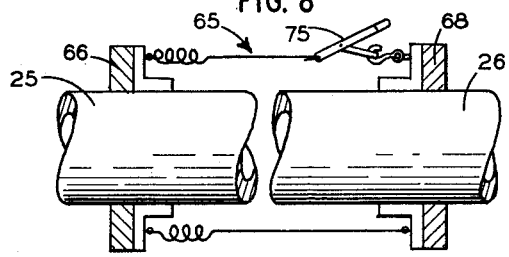
Figure 10:
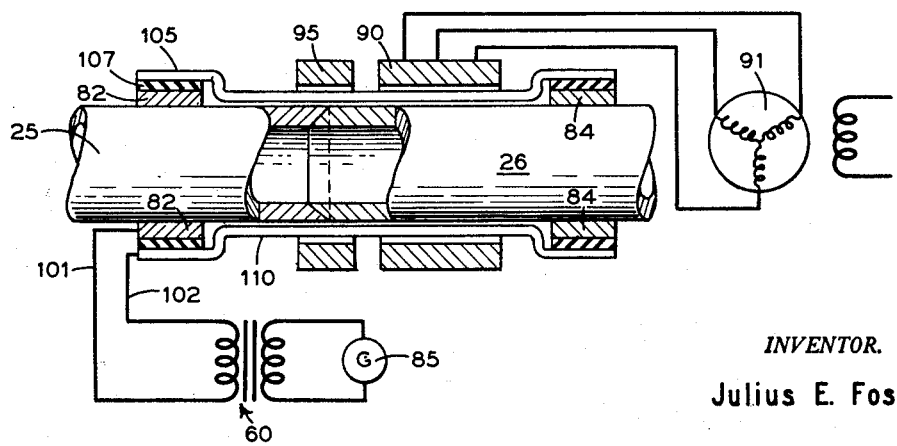
Figure 16:
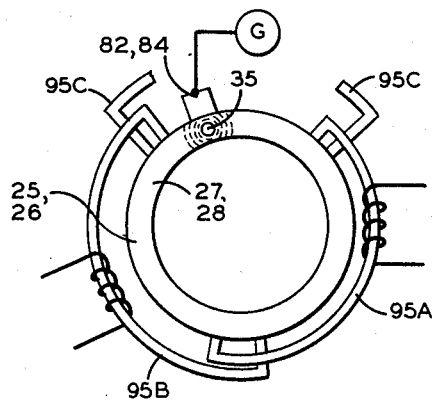
Figure 17:
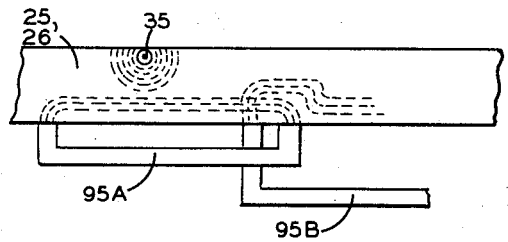
Figure 18:
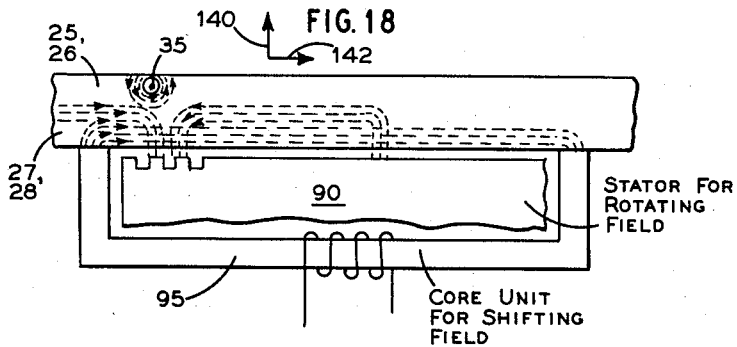

FIGURE 4 is a schematic perspective view of the end surface of a pipe through which a welding current is passing, to illustrate the manner in which a welding current stream section tends to concentrate itself and locate itself centrally between the two contour edges of the section of pipe, due to the ferrous nature of the pipe body, and due to the magnetic flux field encircling the current stream section;

FIGURE 5 is a schematic view of a development of the seam surface at the end of a pipe to illustrate the manner in which the weld current stream section retains its unified character as it is moved progressively along a linear dimension of the seam surface, while at the same time keeping itself centralized in a medial region between the two contour edges of that seam surface;

FIGURE 6 is a schematic and diagrammatic view of a switching system for electro-mechanically shifting a weld current stream section along and around two engaging seam surface areas, which are shown in development, each similar to the single surface showing in FIGURE 5;

FIGURE 7 is a schematic and diagrammatic view of a system and arrangement for welding two pipes end to end in accordance with the principles of this invention;

FIGURE 8 is a schematic side view, illustrating a typical arrangement for mechanically holding the two pipes engaged end to end during the welding operation;

FIGURE 9 is a transverse view, schematically showing the mechanical holding means to illustrate the use of three angularly disposed arms for that purpose;

FIGURE 10 is a schematic diagram of a modified circuit arrangement for the welding current and the electrodes, to reduce the impedance of the effective welding neck;

FIGURE 11 is a schematic and diagrammatic view of the welding circuit of this invention, showing each of the welding electrodes shaped as one convolution of a helix;

FIGURE 12 is a view similar to FIGURE 11, but showing the use of circular electrodes around each pipe;

FIGURE 13 is a schematic perspective view of an electrode, showing a block and strap formation for tightly clamping the electrode on a pipe;

FIGURES 14 and 15 are schematic views of a magnetic arrangement for inducting one annular control flux field at one periphery of the seam surface, shown developed, for shifting the welding current stream section laterally towards the other periphery;

FIGURE 16 is a schematic view that shows the overlapping arrangement of the magnet core structures to achieve a total annular control flux field in the annular pipe seam surface;

FIGURE 17 is a schematic view of a developed portion of the seam surface, and shows how two magnet cores are overlapped to establish a continuous control flux field in an annular region; and FIGURE 18 is a schematic view that shows the rotating control flux field for moving the welding current stream section in a circular path, and that also shows the shifting control flux field for shifting the current stream section laterally towards one contour peripheral edge to be moved through a circular path adjacent that peripheral edge.

Figure 1:
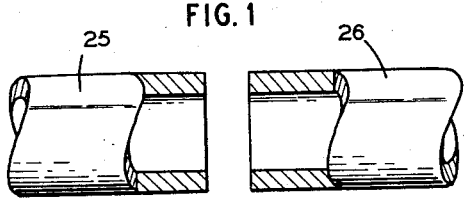
FIGURE 1 is a longitudinal view, partly in elevation and partly in section, of two pipes that are to be welded, shown in their initial condition with square ends.
Figure 2:
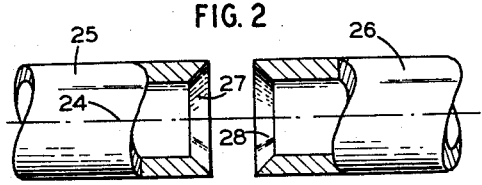
FIGURE 2 is a similar view of the pipes of FIGURE 1, after the adjacent ends are machined or ground to provide scarf surfaces for fitting the two pipes in nested condition.

As shown in FIGURE 1, two pipes 25 and 26 are to be welded end to end. In order that the pipes may be welded by the electric resistance method, it is desirable that the end surfaces of the two adjacent pipes be machined or ground, or otherwise shaped, to have scarfed ends 27 and 28, as shown in FIGURE 2, shaped to the same angle relative to the common axis 24 of the two pipes, thereby permitting the ends of the two pipes 25 and 26 to be nested, with the two scarfs 27 and 28 fitting together conformably, in good surface-to-surface engagement over their respective areas, thereby forming a seam 30 at which the two surfaces are to be welded.

The two pipes 25 and 26 are of iron, steel or steel alloy, any of which will have a relatively high permeability for conducting magnetic flux.

As explained in the U.S. Patent 2,882,384, previously referred to, a high-density electric current, as is normally used in electric resistance welding, when traversing a high permeability material, such as the steel pipe 25 and 26, tends to form a dense stream flow section, tightly compressed by its own encircling magnetic flux field seeking to remain in the ferrous environment, rather than in the surrounding air.

Figure 3:
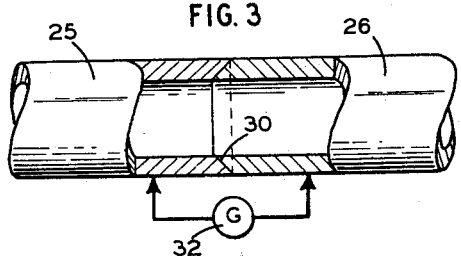
FIGURE 3 is a view similar to those of FIGURES 1 and 2, showing the two pipes in nested position, ready for a welding operation, in which a welding current is fed to the two pipes to cross the seam defined by the two scarf surfaces, as schematically indicated by the generator.

Thus, assuming that a generator 32 is connected between the two pipes 25 and 26, as schematically shown in FIG. 3, so that the resulting current will cross the seam 30, the current stream section through the seam 30 will be substantially as indicated in FIGURE 4 where the current stream section 35 is shown in a position medially between the inner and the outer peripheral contour edges 38 and 39 of the seam surface area 30, with the self-generating magnetic field flux 36 shown encircling the current section 35 and slightly compressed to be confined entirely to a path or region entirely within the ferrous section of the pipe between those two contour edges 38 and 39. Because of the greater permeability of the ferrous material in the pipe, the flux field surrounding the welding current will move into the pipe section rather than traverse the air space outside the pipe section. Of course, some minor fringing flux might project slightly into the air on the outer surface of the pipe, because of partial saturation of the small pipe region, but such minor flux fields are here disregarded, because of their negligible effect.

To achieve the welding between the surfaces at seam 30, the welding current stream section 35 is moved through a path to cross through the entire areas at the annular seam 30. Throughout such movement, the current section 35 substantially maintains its cohesive concentrated form, subject to slight deformation to oval form by its own flux. This is shown in FIGURE 5, where the annular seam area is shown in linear development from the normal circular disposition of FIGURE 4. In both FIGURES 4 and 5, the arrows schematically represent electrodes, or electrode positions, from which the current is fed into or directed out of the pipe seam sections.

In this invention, the welding current stream section 35 is shifted to scan the entire surface areas that are in engagement to form the seam 30. In a part of its path of movement, the current stream section 35 will be moved to position 35–a, and then to position 35–b, and on to other positions necessary to enable that welding current stream section 35 to pass through every part of the surface area of each pipe scarf surface at the seam 30. Thus, in FIGURE 5, the arrows 41 and 41–a and 41–b represent progressive movement of the effective terminal points of the weld current stream section as that current section is moved to scan the entire seam areas.

One way in which this movement of the weld current stream section may be accomplished is schematically indicated in the circuit arrangement of FIGURE 6. The two pipes 25 and 26 are shown engaged to establish the seam surfaces 30. The end surface areas of the two pipes are shown developed, in order that the movement of the weld current stream section may be more easily illustrated. Instead of moving an electrode progressively to different positions, as shown in FIGURE 5, two stationary electrode sets 46 and 48 are shown in FIGURE 6, with the several elements of each set arranged in a circular locus around the periphery of each pipe, and with the several elements insulated from each other. Thus, the set 46 comprises the sections 46–1 to 46–9, inclusive, and the set 48 has a corresponding number of elements insulated from each other and appropriately held in good electrical contact with the outer peripheral surface of the associated pipe 25 or 26. The electrode sections 46–1 and 48–1, and their companions, are electrically respectively connected to corresponding stationary terminals of two switches 56 and 58, whose stationary switch terminals are marked correspondingly 56–1 to 56–9 for electrical connection to the corresponding elements of the sets of electrodes.

In this case, in FIGURE 6, the welding current is indicated as derived from the secondary of a power transformer 60 whose primary is connected to any suitable source having sufficient power capacity to supply the large current required from the secondary for the welding operation here involved. The secondary winding 60–b is connected to the movable wiper electrode 56–10 of switch 56, and to the corresponding wiper electrode 58–10 of the other switch 58.

The two switches 56 and 58 will be operated in synchronism by a common motive device, such as a motor (not shown), to rotate the two movable contact arms or switch wipers 56–10 and 58–10, in order to progressively and successively connect related pairs of the electrode elements of the set 46 and of the set 48 to the secondary 60–b of the power transformer 60, in order thereby to progressively shift the weld current stream section 35 along the length of the seam 30, in the manner schematically indicated in FIGURE 5.

Since, as shown in FIGURE 5, the weld current section will float and move along a medial path, between the upper and the lower contour edges of the scarf surfaces at the seam 30, it will be necessary to also shift the current stream section 35 towards those contour edges so the heating and welding effect will be established also along those contour edges, as well as in and along the medial portion of the seam surfaces.

FIGURE 7 shows a welding system and arrangement for welding the two pipes 25 and 26, end to end, with means for electrodynamically shifting the weld current stream section to scan the entire surface areas at the seam.

As shown in FIGURE 7, the two pipes 25 and 26, are held together by a suitable clamping mechanism 65 that comprises circular strap clamps 66 and 68 securely mechanically and releasably coupled to the respective pipes 25 and 26. The two strap clamps 66 and 68 are respectively provided with three radial arms 71, 72 and 73. Those three arms, 71, 72 and 73 are provided with brackets 74, to brace against the associated pipe, to enable the arms to withstand the tension forces that will be established between two corresponding arms of the two clamps 66 and 68 to hold the two pipes 25 and 26 engaged at the seam surfaces under sufficient pressure to prevent separation of these seam surfaces during the welding operation.

The tension between the two clamps 66 and 68 may be established in various ways. Merely to indicate that such tension forces will be established for the purpose of the operation of this system, a simple toggle mechanism 75 and an associated tension spring 76 are shown, connected between the clamps 66 and 68, that will permit simple application of the tensioning spring and easy release when the clamps are to be separated from the pipe after a welding operation. As indicated in FIGURE 7 and in FIGURE 8, a plurality of such tensioning devices are preferably employed in order to establish balanced tensioning forces between the two clamps 66 and 68, relative to the pipe axis, to avoid skewing.

As further shown in FIGURE 7, in addition to the clamping members 66 and 68, for holding the two pipes in proper position for the welding operation, the welding means include two electrodes 82 and 84 electrically connected to the respective pipes 25 and 26, and disposed to encircle those two pipes to serve as bus bars for the welding current that is to cross the seam 30 to establish the welding action at the seam surfaces.

Welding energy is shown derived from a welding power transformer 60, that receives energy in its primary winding from a suitable generator source 85 and then supplies that energy as welding current of high amperage through its secondary winding to the two electrodes 82 and 84 at the pipes. The welding current stream section will take the form of a concentrated current stream, as shown in FIGURE 4, where it passes through the pipe section, and particularly through the two surfaces at the seam. In order to whirl such current stream section 35 to scan the surface areas at the seam 30, a three-phase stator 90 is employed with three-phase windings suitably arranged to generate a rotating magnetic flux field, when energized from a three-phase generator 91. The stator is a split structure with suitable mechanical holding means, and with circuit connectors for connecting the phase windings across the splits in the stator core structure, as schematically indicated in FIGURE 7.

The windings in the three-phase stator 90 are similar in arrangement and function to a corresponding or similar three-phase winding in the stator of an induction motor, where the rotating magnetic field will react on one or more conductors in a rotor to cause rotation of the rotor around a central axis of the machine.

In this case, the weld current stream section constitutes a movable conductor traversed by a current which generates its own magnetic field. The reaction of the rotating magnetic field, on such weld current stream section as a movable conductor, constitutes, in effect, induction motor action, and establishes corresponding rotation of the current stream section around the central axis, and thereby causes the welding current stream section to scan the surface areas at the seam 30.

The resistance between the scarf surfaces at the seam is considerably higher than in the pipe material. Such high resistance localizes the high heating effect at the seam surfaces.

In order to compel the weld current stream section to shift from its medial path, indicated schematically in FIGS. 4 and 5, to adjacent paths, closer to the peripheral edges, an additional electro-magnet system 95 is employed to develop a flux for such shifting action.

The shifting flux is induced as a relatively static field, to be annularly disposed in the seam surfaces, of appropriate polarity to shift the welding current stream section toward one peripheral edge or the other, as shown in more detail in FIGS. 17 and 18. Two magnetic core structures 95–a and 95–b provide such shifting flux.

FIGURE 10 shows a modified arrangement of that in FIGURE 9, whereby the welding current is supplied to the two electrodes 82 and 84 in a manner to reduce the large impedance that obtains with a large neck opening in the connections between the secondary of the transformer and the electrodes. As shown in FIGURE 10, the two conductors 101 and 102 from the secondary of the power transformer 60 are closely disposed, to limit the space between them which would introduce inductance. The conductor 101 is shown connected directly to the electrode 82 and the conductor 102 is shown connected to an auxiliary support ring 105 separated from the electrode 82 by a suitable insulating spacer 107. The connection from the support 105 is made to the other electrode 84, through one or more conductors 110 that are preferably of thin, but wide, section, in order to have the adequate current-carrying capacity for the large welding current, while at the same time having a relatively thin section, since these strap connectors 110 will be disposed in what is essentially the air gap between the three-phase stator 90 and the pipe sections which will serve as armatures, or flux return elements, for the moving magnetic flux field from the stator, even though those pipe sections are not rotors. It will be remembered that the welding current stream section serves as the movable conductor or rotor, within the sense of motor action.

In order that the welding current stream section may be better controlled, it is preferable that the terminals of that short current stream section, extending through the seam surfaces, shall be relatively parallel to the axis of the pipe system, so that the rotational motion, in the whirling operation of the current stream section, will be accompanied by a corresponding rotational movement of the terminal ends of that current stream section.

In order to control the alignment of the current section terminals, at the point of initial current injection to the welding electrodes, the electrodes may be made in the form of one convolution of a helix, as indicated in FIGURE 11, with the respective ends of the two convolutions in axial alignment. Subsequent whirling of the welding current section will thus always follow from a start at the same point, thereby assuring a relatively uniform type of welding operation or movement of the welding current stream section. With this arrangement, as shown in FIGURE 11, the movement of the welding current stream section may be suitably reversed, by suitable means, each time that the current section reaches either end of the convolution. For that purpose, a detector coil may be positioned to respond to the presence of the welding current field at either end of the convolution, in order to detect a direction of movement of the moving or rotating flux field, and then change the rotating field to a direction that will cause the current section to move in the opposite direction, from that end of the convolution towards its other end. In that manner, the reversed movement of the weld current stream section can be utilized to weld a different area of the seam that may not have been welded during the previous movement of the weld current section.

In a preferred arrangement, the need for reversing the movement of the weld current stream section, as in the arrangement in FIGURE 11, is avoided. In such preferred arrangement, the electrodes 82 and 84 may be made to constitute completely closed circular members, in direct electrical contact with their respective pipes, and the injection points to the two electrodes 82 and 84 are established at predetermined aligned positions by means of suitably located terminals 82–1 and 84–1, as in FIGURE 12.

In order to permit easy application and removal of the electrodes 82 and 84, whether in convolution form or circular ring form, they are preferably made of a set, or series, of copper blocks 115 of substantial section, for low resistance, that are electrically and mechanically connected to a flexible current-conducting strap 120 having suitable means 122 for tightening the strap to press the blocks 115 against the pipe's outer surface for good electrical contact. One block, of each set of blocks, may be provided with suitable terminal means, as 82–1 and 84–1, for connection to an external circuit to receive the welding current therefrom, shown here, for simplicity as the generator in FIGURES 11 and 12.

The manner in which the shifting flux operates to shift the welding current stream section is indicated in FIGURES 14 and 15. The shifting flux from the electromagnet 130 moves the current stream section 35 up or down depending upon the polarity of the shifting flux relative to the polarity of the welding current stream section. This relationship determines the control or shifting action whether the welding current is alternating or direct, and whether the control magnet current is alternating or direct. The necessary relative polarities must be established to cause the shifting desired.

Where the surface to be welded is relatively linear, as in the short section shown in FIGURES 14 and 15, the shifting flux field can be easily induced in the desired location. However, in the annular areas on the pipe ends, a modified electro-magnet system must be employed to obtain the shifting flux in the desired location. The arrangement for achieving this is one of the features of this invention.

In FIGURE 16 is shown a schematic arrangement of the shifting flux electro-magnet system 95, comprising three cores 95–a, 95–b and 95–c, each subtending an arc of less than 180 degrees. By such overlap, the three flux fields are assuredly disposed to co-operate, with the same magnetic polarity and gradient direction.

The development of one seam surface in FIGURE 17, shows how the separate flux fields co-operate to establish an effectively single control flux field for shifting the welding current stream section to one edge or the other, of the seam surfaces to be welded.

FIGURE 18 shows a short part of a development of one pipe end surface of the seam 30. The welding current stream section 35 is shown shifted to the upper contour peripheral edge, which would be the inner peripheral edge of the seam surface of the pipe, since the control electromagnets are on the outer periphery of the pipe.

The shifting flux field from electromagnet 95 is disposed along the lower contour edge and reacts on the welding current stream section 35 to push the welding stream section to the upper contour edge, as indicated by arrow 140. The rotating flux field 145 from the stator 90 then moves the welding current stream section 35 to the right, as indicated by the other arrow 142.

The speed of movement of the welding current stream section, as moved by the rotating flux field, corresponds to the rotational speed of the rotating flux field, and is therefore determined by the stator winding design and the frequency of the energizing source.

The locus or path of movement of the welding current stream section is controlled by the polarity and strength of the shifting flux field, which may be variably controlled to establish the desired locus or path of movement for the welding current stream section.

While the description has illustrated and referred to the welding of annular surfaces, as pipe ends, the location of the annular surfaces is not restricted to pipe ends, but such surfaces, or one of them, may be on a container or vessel of a different shape, which has an annular area encircling an opening, for example, at which a conduit or pipe is to be secured, by welding, to the vessel. In such case, the electrode for the vessel will be located to surround the annular area encircling the opening.

By taking advantage of the annular surface as a closed circular path, the welding current stream section can be located at a selected initial location and then whirled or rotated continuously in a selected direction, while simultaneously shifting the path of the current stream section laterally so the current stream section will scan the entire annular surface area.

Thus, by the method and apparatus disclosed herein, pipes that are to serve in a transmission system, to conduct liquid or gaseous media, or in an oil well-drilling operation, may be easily and quickly welded in the field by relatively unskilled labor, to achieve a joining weld having the advantages of automatic control effective to achieve proper and uniform quality welding conditions.

Similarly, the same welding procedure may be employed in factories to weld pipes to vessels at a seam of two annular surfaces.

The various method steps, arrangements and constructions may be modified within the spirit and scope of the invention as defined in the claims.

What is claimed is:

1. The method of butt-welding two pipes, end to end, over their annular end surfaces, which comprises the steps of
   placing the two annular ends in butting engagement to define an annular seam between the two pipe ends;
   passing a welding current from one pipe to the other between the two pipe ends and through the annular seam to pass through the annular seam surfaces;
   and controlling the weld current stream to cause the stream section to scan the two annular seam surfaces with movement having motion components in co-ordinate directions, circularly, and radially from edge to edge, and to heat those two seam surfaces to establish a welding action between them.

2. The method of butt-welding two pipes, end to end, as in claim 1, in which the current stream section is shifted to scan the seam surfaces by the shifting of the effective terminals of the current stream.

3. The method of butt-welding two pipes, end to end, as in claim 2, in which the shifting of the effective terminals of the current stream is accomplished by shifting the effective terminals of the current stream progressively in a selected direction and path from point to point on the pipe surfaces adjacent the seam.

4. The method of butt-welding two pipes, end to end, as in claim 3, in which the direction and path of each terminal of the current stream is defined in a convolution of a helix.

5. The method of butt-welding two pipes, end to end, as in claim 4, in which the current to the terminal of the weld current stream is introduced at one end of the path defined by said convolution.

6. The method of butt-welding two pipes end to end, which comprises the steps of
   shaping the end of a first pipe with an inner scarf surface at a predetermined angle to the axis;
   shaping the end of the second pipe with an outer scarf surface at said same angle so the second pipe end will seat conformably into the first pipe end, surface-to-surface, to define an annular seam between the two pipe ends;
   and welding the two pipe ends by passing a welding current between the two pipe ends and through the annular seam to pass through the scarved surfaces, and by controlling the weld current stream to cause the stream section to scan the two annular seam surfaces with motion having components in circular directions around the annular ring surfaces, and having components in radial directions to each peripheral edge, thereby to cover the entire seam surfaces from edge to edge, and to heat the two surfaces to establish a welding action.

7. The method of butt-welding two pipes, end to end, over defined annular end surface areas by electric resistance heating effect of a current supplied to cross the engaging surface areas, which consists in
   supplying the current to the two pipes at points adjacent but on opposite sides of the seam to thereby determine the initial terminal points of a current path through and transverse to the engaging surface areas at the seam;
   and generating magnetic flux control fields along and around the outer edge of the annular seam and causing said control fields to react on the magnetic flux field of the welding current stream section to cause the welding current stream section to shift and move through a predetermined path relative to the annular seam area to scan the entire seam area between the circular borders of the annular seam areas by motion with circular and radial components to each edge to thereby heat and weld the entire engaging surface areas of the seam.

8. The method of butt-welding two pipes, end to end, as in claim 7, in which the generating of the magnetic flux control fields includes the step of generating a second magnetic flux control field to react on the magnetic flux field of the welding current stream section to apply a radial reaction force on said welding current stream to move said current stream to a peripheral edge of said annular end surface area.

9. A welding system for butt-welding two pipes, end to end, comprising
   means for holding the two pipes end-to-end with the annular end surfaces in engagement to constitute a seam;
   an electrode electrically engaging and encircling each pipe over a generally cylindrical area adjacent the seam for establishing a welding current path between the electrodes and through the seam surfaces when the electrodes are connected to an external power source;
   and electromagnetic means encircling the seam for generating a magnetic flux control field to react on the magnetic flux field of the welding current stream in order to cause the welding current stream section to shift and move in a generally circular path contained within the annular surface areas of the seam, and means encircling the seam for generating an effectively circular magnetic flux control field to shift the current stream radially, whereby the moving welding current will heat and weld the engaging surface areas of the seam.

10. In the practice of butt-welding two pipes, end to end, the method of disposing welding current electrodes on the two pipes to transmit the welding current across the seam, which consists in disposing each electrode as an elongated bus in a helical locus covering substantially one convolution of the helix, on opposite sides of the seam.

11. The method of claim 10, including the step of electro-dynamically shifting the welding current stream section in a generally circular path defined by the butting seam surfaces, with the electrodes serving to provide available locations for the moving terminals of the welding current stream.

12. The method of butt-welding two pipes, end to end, by resistance heating at the engaging annular surfaces that are to form the seam, as generated by a welding current flowing between two electrodes respectively electrically connected to the pipes adjacent and on opposite sides of the seam surfaces, which method consists in arranging each electrode to cover the contour of a full circle on the associated pipe, so each terminal of the weld current stream can move in a path around the full perimeter of the pipe;
then supplying the weld current to said terminals;
and then electro-dynamically swinging the weld current stream section around the pipe and radially in said annular surfaces to scan and heat and weld the seam surfaces.

13. A welding system for butt-welding the butting end surfaces of two adjacent pipes, comprising
means for holding the two end surfaces in engagement;
electrode means for electrical connection to each pipe adjacent and respectively on opposite sides of the butted seam surfaces to define a circular zone for the terminal limits of a path for the welding current through the seam surfaces;
and means for controlling the portion of the welding stream at the butting end surfaces and for progressively shifting the terminals of the welding current stream through said circular zone to cause the weld current stream section to scan the seam surfaces and heat them to establish a weld between them.

14. Apparatus for butt-welding two pipes end to end, comprising
means for holding the end surfaces of the pipes in engagement where the seam is to be formed;
an electrode for electrical connection to each pipe, each electrode providing a current-conducting bus to completely encircle its associated pipe;
means for holding the electrode tightly in peripheral electrical contact with the pipe;
a terminal on each electrode for connection to an external electric circuit from which the welding current will be received;
and electro-dynamic means for encircling the seam region and for devolping a magnetic flux control field for shifting the weld current stream section through a predetermined path including circular and radial components to scan the surfaces at the seam and to effect welding action.

15. The method of butt-welding two pipes, as in claim 1, in which
a magnetic flux field effectively circular is established within an annular region of the seam adjacent either one of the peripheral edges of the seam for pressing the weld current stream section to the other peripheral edge region in said radial direction during the control action of the moving magnetic flux field on the weld current stream section.

16. Apparatus for butt-welding two pipes, as in claim 14, including, additionally, means for selectively magnetizing an annular region of the seam adjacent one peripheral contour edge of the seam.

17. Apparatus for butt-welding two pipes, as in claim 16, in which said additional magnetizing means includes means for magnetizing a plurality of sections of one annular region of the seam adjacent one peripheral contour edge to establish substantial continuity of the magnetizing flux field in said annular region of the seam.

18. Apparatus for butt-welding two pipes, as in claim 17, including additional means for selectively controlling the location of the magnetization at one annular region or the other adjacent one peripheral contour edge or the other.

19. The method of welding two annular surfaces of ferrous material to each other to form a seam, which consists in
establishing a terminal path for a current stream, with the path in a region encircling each annular surface;
passing a current between said two terminal paths to pass through the two annular surfaces;
and rotating the current stream section around the seam area while establishing a lateral shifting force on said current stream section to cause said current stream section to move to each of the two peripheral edges of said annular surfaces, thereby to scan the annular surface areas at the seam.

20. The method of welding two annular surface areas on separate bodies, to form a welded seam, which consists in
passing a welding current stream between the two bodies to pass through the two annular surfaces;
and rotating the current stream section around the seam area with appropriate radial shift of the current stream section to scan the entire annular seam surface areas to the inner and the outer peripheral edges.

21. A welding system for welding two individual bodies at engaging annular surface areas on the respective bodies, to form a welded seam between the bodies, said system comprising
a separate electrode encircling the annular surface on each body, to locate the terminals of a welding current stream that is to flow through the annular surface areas, when the electrodes are connected to a source of welding current;
and means disposed adjacent the seam area to develop a magnetic flux field that will be located in position to react electro-dynamically with the self-developed flux around the welding current stream section passing through the seam, to cause said welding current stream section to rotate in a path contained within the seam area; and second means adjacent said seam area for inducing a circular magnetic field in said annular surface areas and operative to vary the intensity of said circular field to cause radial movement of said welding current stream section to either peripheral edge, whereby such combined rotational and radial movement of said welding current stream section will scan the entire annular seam surface areas to heat said entire areas and establish complete welding action from peripheral edge to edge.

22. A welding system, as in claim 21 in which said second means includes means for inducing an annular magnetic flux field in either of the peripheral border regions of the seam areas to shift the welding current stream section laterally from the medial region of the seam surfaces to the other peripheral border region.

23. In the process of welding two annular surfaces to each other by a welding current passing through said surfaces, the operation of effecting a shifting movement of such welding current, which includes the step of inducing an annular magnetic flux in said annular surfaces in a border region at one peripheral edge of each of said annular surfaces with sufficient intensity in said flux field to effect such shifting movement of such welding current to the opposite peripheral edge of each of said annular surfaces.

24. The method of inducing an annular magnetic flux field in a circular border region of an annular area of a magnetic body, which consists in inducing a plurality of individual magnetic flux fields in sequential overlapping arrangement in sequential portions of said border region of the annular area.

25. A magnetizing system for magnetizing an annular region of a magnetic body, to establish an annular directionally continuous magnetic field in a circular inner or outer peripheral border zone of said annular region, comprising a plurality of magnetizing means each respectively serially disposed around said annular region to induce a flux field in a serially disposed portion of said circular border zone of said annular surface, with the flux fields serially located and arranged to overlap at the end of one field and the beginning of the next serial other field.

References Cited in the file of this patent
UNITED STATES PATENTS

| | | |
|---|---|---|
| 438,658 | Thomson | Oct. 21, 1890 |
| 499,040 | Ries | June 6, 1893 |
| 1,924,915 | Cutter | Aug. 29, 1933 |
| 2,286,210 | Klemperer et al. | June 16, 1942 |
| 2,344,939 | Bennett | Mar. 28, 1949 |
| 2,882,384 | Foster | Apr. 14, 1959 |